United States Patent
Moga

(10) Patent No.: US 10,383,325 B2
(45) Date of Patent: Aug. 20, 2019

(54) RODENT CAPTURING SYSTEM

(71) Applicant: Chuck Moga, Clear Lake, MN (US)

(72) Inventor: Chuck Moga, Clear Lake, MN (US)

( * ) Notice: Subject to any disclaimer, the term of this patent is extended or adjusted under 35 U.S.C. 154(b) by 215 days.

(21) Appl. No.: 15/398,220

(22) Filed: Jan. 4, 2017

(65) Prior Publication Data

US 2018/0184641 A1  Jul. 5, 2018

(51) Int. Cl.
*A01M 23/10* (2006.01)
*A01M 23/02* (2006.01)
*A01M 25/00* (2006.01)

(52) U.S. Cl.
CPC ............ *A01M 23/10* (2013.01); *A01M 23/02* (2013.01); *A01M 25/002* (2013.01)

(58) Field of Classification Search
CPC ............................... A01M 23/10; A01M 23/02
USPC .......................................... 43/71, 72, 64, 74
See application file for complete search history.

(56) References Cited

U.S. PATENT DOCUMENTS

| | | | | |
|---|---|---|---|---|
| 710,020 A * | 9/1902 | Short | ................ | A01M 21/00 |
| | | | | 43/71 |
| 861,222 A | 7/1907 | Newlove | | |
| 1,050,220 A * | 1/1913 | Link | ................ | A01M 23/10 |
| | | | | 43/71 |
| 1,392,425 A | 10/1921 | Lippold | | |
| 1,600,347 A | 9/1926 | Martin | | |
| 1,820,579 A | 8/1931 | Nakagawa | | |
| 2,234,983 A * | 3/1941 | Russell | ................ | A01M 23/04 |
| | | | | 43/69 |
| 2,619,765 A * | 12/1952 | Sees | ................ | A01M 23/12 |
| | | | | 43/64 |
| 3,423,870 A | 1/1969 | Kost | | |
| 3,528,191 A * | 9/1970 | Hand | ................ | A01M 23/10 |
| | | | | 43/64 |
| 3,778,923 A * | 12/1973 | Cuoco | ................ | A01M 23/04 |
| | | | | 43/69 |
| 4,662,101 A | 5/1987 | Fisher | | |
| 5,517,784 A * | 5/1996 | Sedore | ................ | A01M 23/04 |
| | | | | 43/64 |
| 5,528,852 A * | 6/1996 | Sarff | ................ | A01M 23/10 |
| | | | | 43/64 |
| D382,039 S | 8/1997 | Zyra | | |
| 5,782,034 A * | 7/1998 | Robin | ................ | A01M 23/10 |
| | | | | 43/64 |
| 5,996,274 A * | 12/1999 | Smith | ................ | A01M 23/10 |
| | | | | 43/64 |
| 6,212,819 B1 * | 4/2001 | Edwards | ................ | A01M 23/10 |
| | | | | 43/71 |
| 6,990,767 B1 | 1/2006 | Margalit | | |

(Continued)

FOREIGN PATENT DOCUMENTS

| | | | | |
|---|---|---|---|---|
| CA | 2370335 A1 * | 7/2003 | ............ | A01M 23/10 |
| CA | 2666823 A1 * | 11/2009 | ............ | A01M 23/10 |
| WO | WO0201135 | 1/2002 | | |

*Primary Examiner* — Darren W Ark

(57) ABSTRACT

A rodent capturing system includes a bucket that may be positioned on a support surface. A fluid is contained in the bucket and the fluid is comprised of a toxic material with respect to rodents. A pair of ramps is provided and each of the ramps extends between the bucket and the support surface thereby facilitating a rodent to climb the ramps. A lure is rotatably coupled to the bucket. The rodent climbs on the lure thereby facilitating the lure to drop the rodent into the fluid. In this way the fluid kills the rodent.

8 Claims, 5 Drawing Sheets

(56) References Cited

U.S. PATENT DOCUMENTS

| | | | |
|---|---|---|---|
| 7,627,981 B1* | 12/2009 | Doster | A01M 23/10 242/599.1 |
| 9,119,389 B2* | 9/2015 | Perry | A01M 23/16 |
| 2010/0132244 A1* | 6/2010 | Ridge | A01M 23/10 43/71 |

* cited by examiner

RODENT CAPTURING SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to capturing devices and more particularly pertains to a new capturing device for capturing and killing rodents.

BRIEF SUMMARY OF THE INVENTION

An embodiment of the disclosure meets the needs presented above by generally comprising a bucket that may be positioned on a support surface. A fluid is contained in the bucket and the fluid is comprised of a toxic material with respect to rodents. A pair of ramps is provided and each of the ramps extends between the bucket and the support surface thereby facilitating a rodent to climb the ramps. A lure is rotatably coupled to the bucket. The rodent climbs on the lure thereby facilitating the lure to drop the rodent into the fluid. In this way the fluid kills the rodent.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
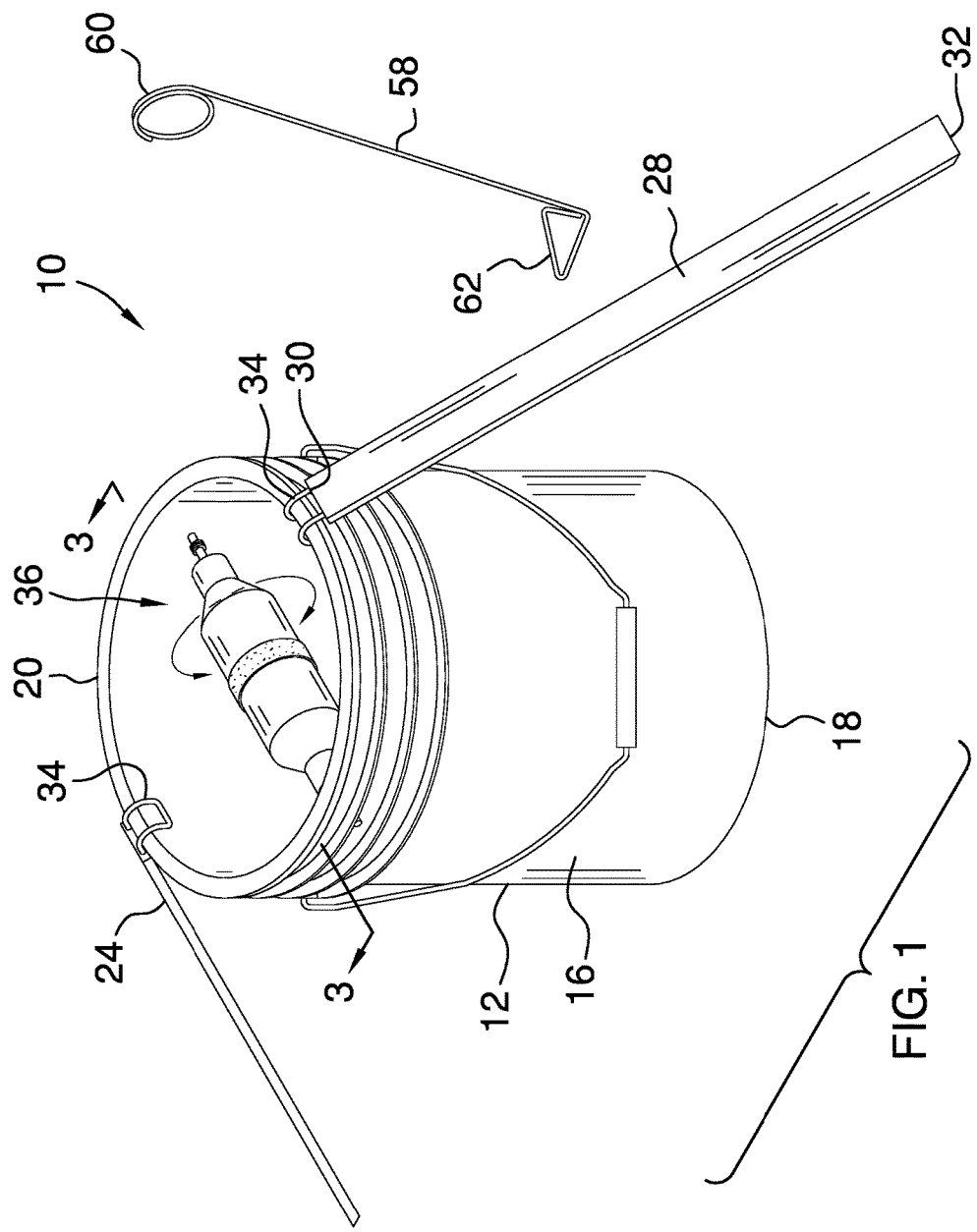
FIG. 1 is a top perspective view of a rodent capturing system according to an embodiment of the disclosure.
Figure 2:
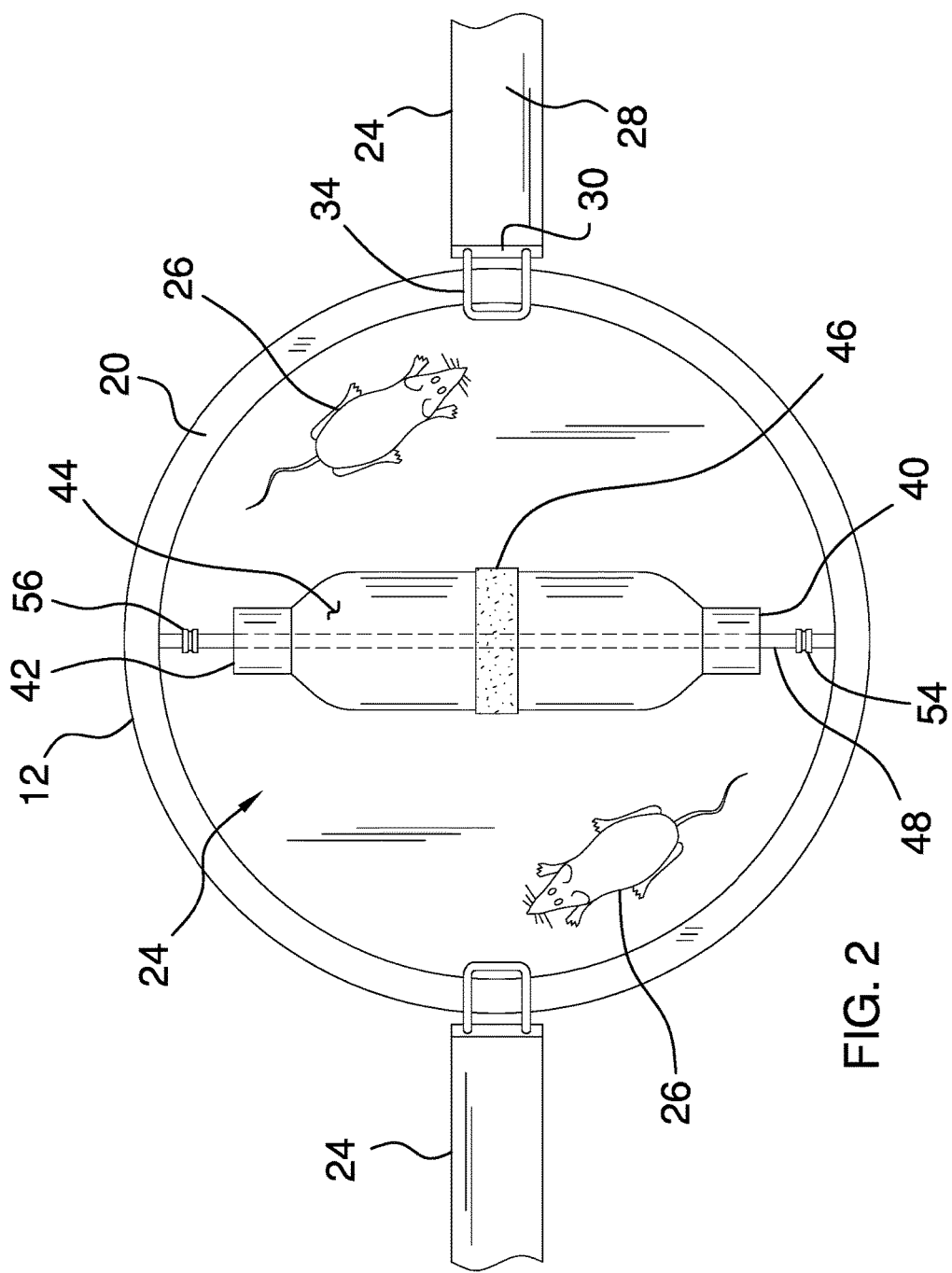
FIG. 2 is a top view of an embodiment of the disclosure.
Figure 3:
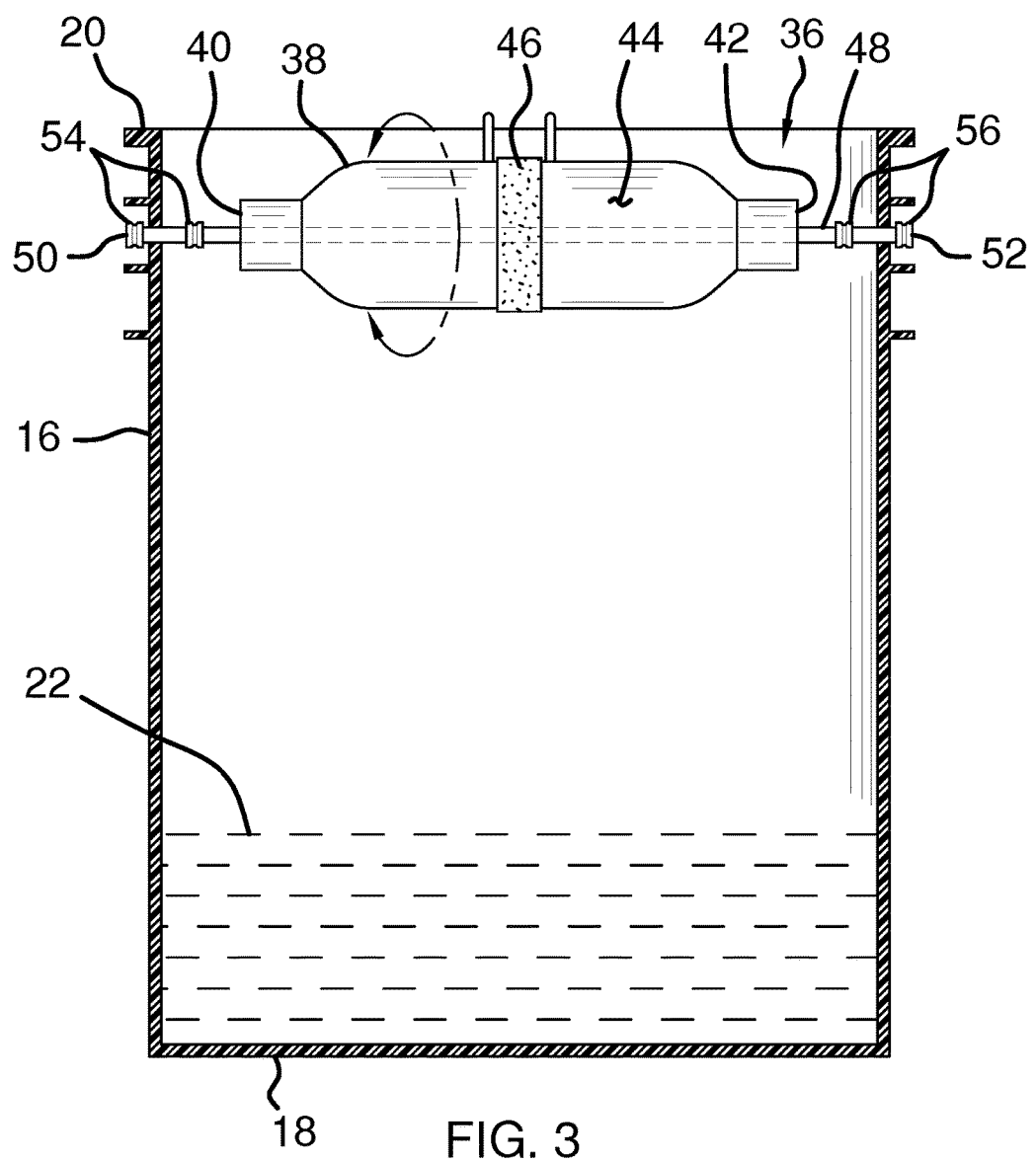
FIG. 3 is a cross sectional view taken along line 3-3 of FIG. 1 of an embodiment of the disclosure.
Figure 4:
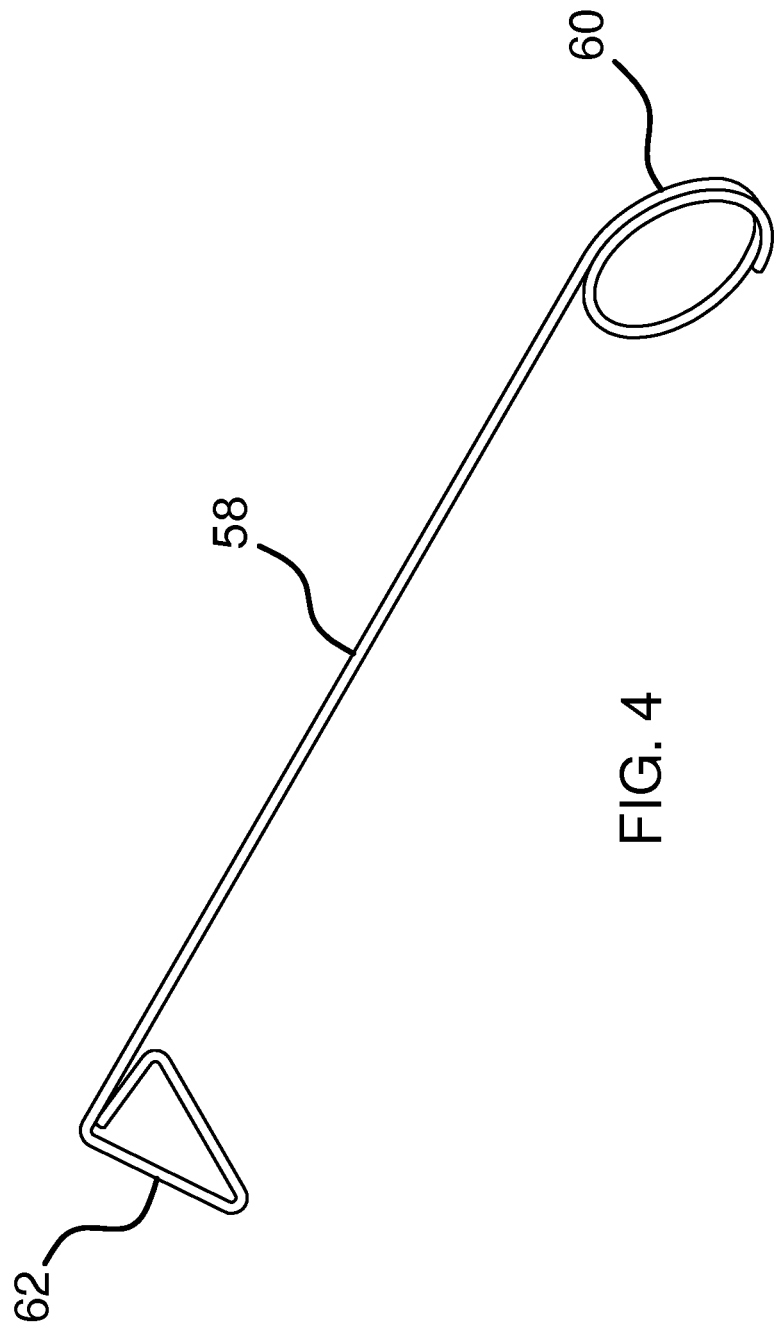
FIG. 4 is a perspective view of a removal tool of an embodiment of the disclosure.
Figure 5:
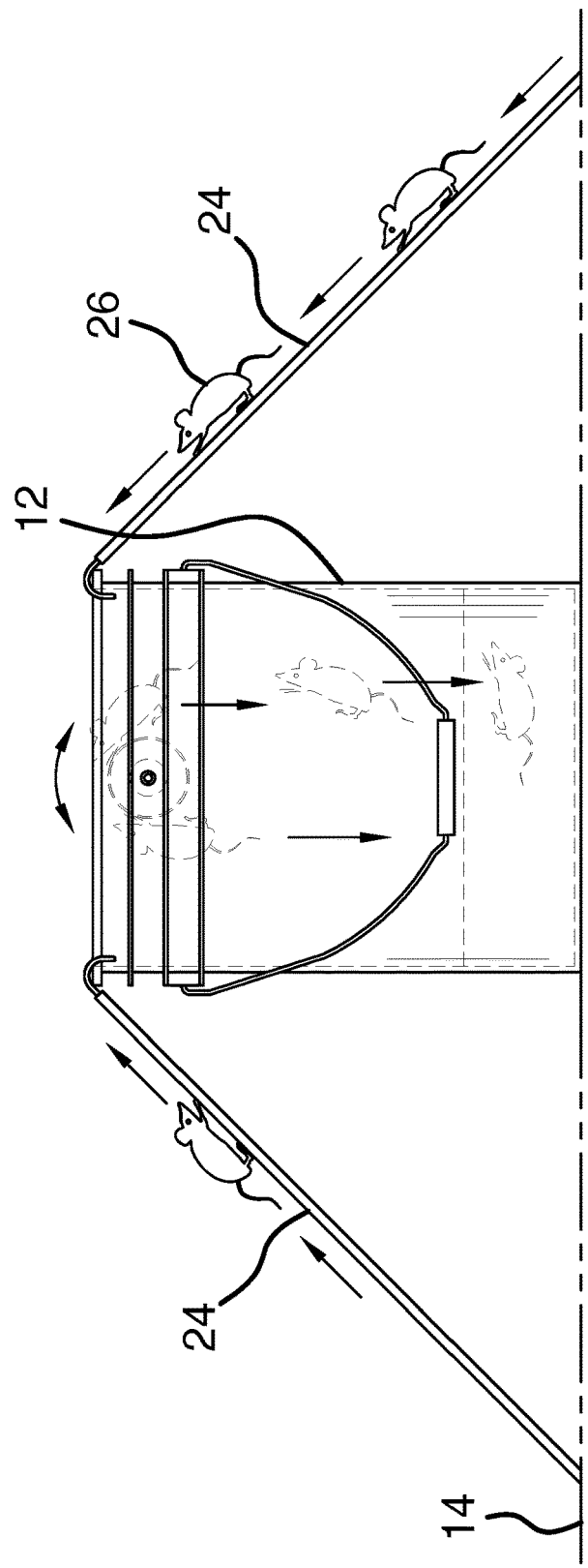
FIG. 5 is a perspective in-use view of an embodiment of the disclosure.

With reference now to the drawings, and in particular to FIGS. 1 through 5 thereof, a new capturing device embodying the principles and concepts of an embodiment of the disclosure and generally designated by the reference numeral 10 will be described.

As best illustrated in FIGS. 1 through 5, the rodent capturing system 10 generally comprises a bucket 12 that may be positioned on a support surface 14. The support surface 14 may be ground or the like. The bucket 12 has an outer wall 16 and a bottom wall 18 and the outer wall 16 has a distal edge 20 with respect to the bottom wall 18. The bucket 12 may be a five gallon bucket or the like. A fluid 22 is contained in the bucket 12 and the fluid 22 is comprised of a toxic material with respect to rodents. The fluid 22 may be RV antifreeze or the like.

A pair of ramps 24 is provided and each of the ramps 24 is removably coupled to the bucket 12. Each of the ramps 24 extends between the bucket 12 and the support surface 14 thereby facilitating a rodent 26 to climb the ramps 24. The rodent 26 may be a rat, a mouse or any other wild rodent 26.

Each of the ramps 24 comprises a panel 28 that has a first end 30 and a second end 32. The panel 28 is elongated between the first end 30 and the second end 32. A hook 34 is coupled to the first end 30 of the panel 28 and the hook 34 curves downwardly from the first end 30. The hook 34 engages the distal edge 20 of the bucket 12 to retain the panel 28 on the bucket 12.

A lure 36 is provided and the lure 36 is rotatably coupled to the bucket 12. The rodent 26 climbs on the lure 36 thereby facilitating the lure 36 to drop the rodent 26 into the fluid 22. In this way the fluid 22 kills the rodent 26.

The lure 36 comprises a cylinder 38 that has a first end 40, a second end 42 and an outer surface 44 extending therebetween. A bait strip 46 is provided and the bait strip 46 extends around the outer surface 44. The bait strip 46 is comprised of a rodent attracting material such as peanut butter or the like. In this way the bait strip 46 attracts the rodent 26 to climb onto the cylinder 38. The bait strip 46 is centrally positioned between the first end 40 and the second end 42. The cylinder 38 is comprised of a smooth, abrasion resistant material thereby inhibiting the rodent 26 from gripping the cylinder 38. The outer surface 44 has a cylindrical middle portion and a pair of tapered outer portions extending away from respective opposite ends of the middle portion and towards respective ones of the first end 40 and the second end 42.

A cord 48 is provided that has a primary end 50 and a secondary end 52. The cord 48 extends through each of the first end 40 and the second end 42 of the cylinder 38 such that the cylinder 38 is rotatably positioned on the cord 48. Each of the primary end 50 and the secondary end 52 extends through the outer wall 16 of the bucket 12. In this way the cylinder 38 is rotatably suspended in the bucket 12. Moreover, the cylinder 38 rolls when the rodent 26 climbs into the cylinder 38 thereby facilitating the rodent 26 to be dropped into the fluid 22. The cord 48 is positioned closer to the distal edge 20 of the bucket 12 than the bottom wall 18 of the bucket 12. The cord 48 may be comprised of a shielded, braided cable or the like. Thus, the cord 48 resists being abraded via friction with the cylinder 38 and contact with rodent 26.

A pair of first retainers 54 is provided and each of the first retainers 54 is coupled around the cord 48. Each of the first retainers 54 is positioned closer to the primary end 50 than the secondary end 52. Moreover, each of the first retainers 54 is positioned on opposite sides of the outer wall 16 of the bucket 12. In this way the primary end 50 of the cord 48 is inhibited from being removed from the bucket 12. Each of the first retainers 54 may be a crimped cable nut or the like.

A pair of second retainers 56 is provided and each of the second retainers 56 is coupled around the cord 48. Each of the second retainers 56 is positioned closer to the secondary end 52 than the primary end 50. Moreover, each of the second retainers 56 is positioned on opposite sides of the outer wall 16 of the bucket 12. In this way the secondary end 52 of the cord 48 is inhibited from being removed from the bucket 12. Each of the second retainers 56 may be a crimped cable nut or the like.

A removal tool 58 is provided and the removal tool 58 is manipulated to remove the rodent 26 from the bucket 12 when the rodent 26 is dead. The removal tool 58 has a first end 60 and a second end 62. The first end 60 of the removal tool 58 may be shaped into a closed ring for gripping. The second end 62 of the removal tool 58 may be shaped into hook 34 or the like for grabbing the rodent 26.

In use, the bucket 12 is positioned in an area known to be inhabited by rodent 26s. The fluid 22 is poured into the bucket 12 to a level below the cylinder 38. Each of the ramps 24 is positioned to extend between the distal edge 20 of the bucket 12 and the support surface 14. The rodent 26 climbs one of the ramps 24 and climbs onto the cylinder 38 in an attempt to reach the bait strip 46. The cylinder 38 spins when the rodent 26 climbs onto the cylinder 38 thereby dropping the rodent 26 into the fluid 22. The fluid 22 kills the rodent 26 and the removal tool 58 is manipulated to remove the dead rodent 26 from the fluid 22.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A rodent capturing system comprising:
   a bucket being configured to be positioned on a support surface, said bucket having an outer wall and a bottom wall, said outer wall having a distal edge with respect to said bottom wall;
   a fluid being contained in said bucket, said fluid being comprised of a toxic material with respect to rodents;
   a pair of ramps, each of said ramps being removably coupled to said bucket wherein each of said ramps is configured to extend between the bucket and the support surface thereby facilitating a rodent to climb said ramps; and
   a lure being rotatably coupled to said bucket wherein said lure is configured to have the rodent climb thereon thereby facilitating said lure to drop the rodent into said fluid, wherein said fluid is configured to kill the rodent, said lure comprising
   a cylinder having a first end, a second end and an outer surface extending therebetween, said outer surface having a cylindrical middle portion and a pair of tapered outer portions extending away from respective opposite ends of said middle portion and towards respective ones of said first end and said second end of said cylinder, and
   a cord having a primary end and a secondary end, said cord extending through each of said first end and said second end of said cylinder such that said cylinder is rotatably positioned on said cord and centered within said outer wall of said bucket, each of said primary end and said secondary end extending through said outer wall of said bucket having said cylinder being rotatably suspended and centered in said bucket relative to said outer wall wherein said cylinder is configured to roll when the rodent climbs onto said cylinder thereby facilitating the rodent to be dropped into said fluid.

2. The system according to claim 1, wherein each of said ramps comprises a panel having a first end and a second end, said panel being elongated between said first end and said second end.

3. The system according to claim 2, further comprising a hook being coupled to said first end of said panel, said hook curving downwardly from said first end of said panel, said hook engaging said distal edge of said bucket.

4. The system according to claim 1, further comprising a bait strip extending around said outer surface wherein said bait strip is configured to attract the rodent to climb onto said cylinder, said bait strip being centrally positioned between said first end and said second end of said cylinder.

5. The system according to claim 1, wherein said cord is positioned closer to said distal edge of said bucket than said bottom wall of said bucket.

6. The system according to claim 5, further comprising a pair of first retainers, each of said first retainers being coupled around said cord, each of said first retainers being positioned closer to said primary end than said secondary end, each of said first retainers being positioned on opposite sides of said outer wall of said bucket such that said primary end of said cord is inhibited from being removed from said bucket.

7. The system according to claim 5, further comprising a pair of second retainers, each of said second retainers being coupled around said cord, each of said second retainers being positioned closer to said secondary end than said primary end, each of said second retainers being positioned on opposite sides of said outer wall of said bucket such that said secondary end of said cord is inhibited from being removed from said bucket.

8. A rodent capturing system comprising:
- a bucket being configured to be positioned on a support surface, said bucket having an outer wall and a bottom wall, said outer wall having a distal edge with respect to said bottom wall;
- a fluid being contained in said bucket, said fluid being comprised of a toxic material with respect to rodents;
- a pair of ramps, each of said ramps being removably coupled to said bucket wherein each of said ramps is configured to extend between the bucket and the support surface thereby facilitating a rodent to climb said ramps, each of said ramps comprising:
  - a panel having a first end and a second end, said panel being elongated between said first end and said second end, and
  - a hook being coupled to said first end of said panel, said hook curving downwardly from said first end, said hook engaging said distal edge of said bucket; and
- a lure being rotatably coupled to said bucket wherein said lure is configured to have the rodent climb thereon thereby facilitating said lure to drop the rodent into said fluid, wherein said fluid is configured to kill the rodent, said lure comprising:
  - a cylinder having a first end, a second end and an outer surface extending therebetween, said outer surface having a cylindrical middle portion and a pair of tapered outer portions extending away from respective opposite ends of said middle portion and towards respective ones of said first end and said second end of said cylinder,
  - a bait strip extending around said outer surface wherein said bait strip is configured to attract the rodent to climb onto said cylinder, said bait strip being centrally positioned between said first end and said second end of said cylinder,
  - a cord having a primary end and a secondary end, said cord extending through each of said first end and said second end of said cylinder such that said cylinder is rotatably positioned on said cord and centered within said outer wall of said bucket, each of said primary end and said secondary end extending through said outer wall of said bucket having said cylinder being rotatably suspended in said bucket wherein said cylinder is configured to roll when the rodent climbs onto said cylinder thereby facilitating the rodent to be dropped into said fluid, said cord being positioned closer to said distal edge of said bucket than said bottom wall of said bucket,
  - a pair of first retainers, each of said first retainers being coupled around said cord, each of said first retainers being positioned closer to said primary end than said secondary end, each of said first retainers being positioned on opposite sides of said outer wall of said bucket such that said primary end of said cord is inhibited from being removed from said bucket, and
  - a pair of second retainers, each of said second retainers being coupled around said cord, each of said second retainers being positioned closer to said secondary end than said primary end, each of said second retainers being positioned on said opposite sides of said outer wall of said bucket such that said secondary end of said cord is inhibited from being removed from said bucket.

* * * * *